United States Patent
Doeffinger et al.

(10) Patent No.: US 11,378,306 B2
(45) Date of Patent: Jul. 5, 2022

(54) SUPPLY MODULE HAVING A HEATING DEVICE FOR CONVEYING AN OPERATING/AUXILIARY AGENT CAPABLE OF FREEZING

(71) Applicant: Robert Bosch GmbH, Stuttgart (DE)

(72) Inventors: Andreas Doeffinger, Leonberg (DE); Martin Kiontke, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 445 days.

(21) Appl. No.: 15/760,691

(22) PCT Filed: Jul. 18, 2016

(86) PCT No.: PCT/EP2016/067027
§ 371 (c)(1),
(2) Date: Mar. 16, 2018

(87) PCT Pub. No.: WO2017/045807
PCT Pub. Date: Mar. 23, 2017

(65) Prior Publication Data
US 2018/0274816 A1    Sep. 27, 2018

(30) Foreign Application Priority Data

Sep. 18, 2015   (DE) ..................... 10 2015 217 931.1

(51) Int. Cl.
*F24H 1/00*    (2022.01)
*H05B 3/04*    (2006.01)
(Continued)

(52) U.S. Cl.
CPC ............. *F24H 1/009* (2013.01); *F01N 3/206* (2013.01); *F01N 3/2066* (2013.01);
(Continued)

(58) Field of Classification Search
CPC ............. F01N 2610/02; F01N 2610/10; F01N 2610/1406; F01N 3/2066;
(Continued)

(56) References Cited

U.S. PATENT DOCUMENTS

2009/0078692 A1*  3/2009  Starck ................... F01N 3/2066
                                                    219/260
2013/0090015 A1*  4/2013  Monson ................. H01R 31/06
                                                    439/628
(Continued)

FOREIGN PATENT DOCUMENTS

CN    102713184 A    10/2012
CN    103459793 A    12/2013
(Continued)

OTHER PUBLICATIONS

International Search Report for Application No. PCT/EP2016/067027 dated Oct. 27, 2016 (English Translation, 2 pages).

*Primary Examiner* — Tu B Hoang
*Assistant Examiner* — Vy T Nguyen
(74) *Attorney, Agent, or Firm* — Michael Best & Friedrich LLP

(57) ABSTRACT

The invention relates to a supply module (10) for conveying an operating/auxiliary agent capable of freezing for the exhaust gas aftertreatment of an internal combustion engine and for heating a reservoir holding the operating/auxiliary agent capable of freezing. The supply module (10) comprises a main heater (18) and an auxiliary heater (30), which are electrically contacted on a supporting body (24). A pot wall (52) of a heating pot (50) comprises electrical contacts (62) of the main heater (18) and electrical contacts (60) of the auxiliary heater (30).

20 Claims, 6 Drawing Sheets

(51) Int. Cl.
  *H05B 3/44* (2006.01)
  *F01N 3/20* (2006.01)
  *F01N 3/28* (2006.01)
  *F24H 1/20* (2022.01)

(52) U.S. Cl.
  CPC .......... *F01N 3/2896* (2013.01); *F24H 1/202* (2013.01); *H05B 3/04* (2013.01); *H05B 3/44* (2013.01); *F01N 2610/02* (2013.01); *F01N 2610/10* (2013.01); *F01N 2610/1406* (2013.01); *H05B 2203/013* (2013.01); *H05B 2203/014* (2013.01); *H05B 2203/02* (2013.01); *Y02T 10/12* (2013.01)

(58) Field of Classification Search
  CPC ......... F01N 2610/1426; F01N 2240/16; F01N 2610/1486; F01N 2900/1811; F01N 3/206; F01N 3/2896; Y02T 10/24; H05B 2203/014; H05B 2203/02; H05B 2203/003; H05B 2203/013; H05B 2203/016; H05B 2203/021; H05B 3/04; H05B 3/18; H05B 3/286; H05B 3/44; H05B 3/78; H05B 3/82; F24H 1/009; F24H 1/202

USPC .......... 219/219, 202–208; 137/351, 59, 334; 392/441, 500; 60/274, 320, 277, 295
See application file for complete search history.

(56) References Cited

U.S. PATENT DOCUMENTS

| | | | | |
|---|---|---|---|---|
| 2013/0125531 | A1* | 5/2013 | Choi | F01N 3/208 60/274 |
| 2013/0263941 | A1* | 10/2013 | Landes | B01D 35/005 137/351 |
| 2013/0269789 | A1* | 10/2013 | Fromont | F01N 3/2066 137/59 |
| 2013/0280958 | A1* | 10/2013 | Landes | H01R 13/46 439/625 |
| 2017/0009925 | A1* | 1/2017 | Bardin | B60K 13/04 |

FOREIGN PATENT DOCUMENTS

| | | |
|---|---|---|
| DE | 102013217333 | 5/2014 |
| DE | 102013217927 | 3/2015 |
| DE | 102013222288 | 5/2015 |
| DE | 102014211251 | 12/2015 |
| KR | 20140060802 A | 5/2014 |
| WO | 2007017080 A1 | 2/2007 |
| WO | 2008138757 | 11/2008 |

* cited by examiner

Prior Art

Fig. 4.1

SUPPLY MODULE HAVING A HEATING DEVICE FOR CONVEYING AN OPERATING/AUXILIARY AGENT CAPABLE OF FREEZING

BACKGROUND OF THE INVENTION

The present invention relates to a device for heating an operating/auxiliary agent for an internal combustion engine, wherein the operating/auxiliary agent is in particular a freezing-capable reduction agent for reducing pollutants in the exhaust gas of the internal combustion engine.

DE 10 2013 217 333 A1 relates to an in-tank filter and to a filter medium that is suitable therefor. The in-tank filter serves for filtering a liquid, and has a first filter side and a second filter side. A receptacle space is disposed between said two filter sides; furthermore, filtered liquid from the receptacle space is dischargeable by way of a connector. In order for a housing to be formed, an annular circumferential wall which encloses the first filter side and the second filter side is provided, wherein at least one filter side has a pleated filter medium.

DE 10 2013 222 288 A1 refers to a supply module for conveying an operating/auxiliary agent. A supply module for conveying an operating/auxiliary agent, in particular a freezing-capable reduction agent for an exhaust gas post-treatment system, comprises a support part on which a conveying apparatus and a filter are received. The filter represents a mounting for a heater that substantially encloses said filter. The filter body of the filter comprises a first and a second housing half. The heater is formed by a number of heater-wire coils. The filter is positioned on an attachment face of a support part that is configured so as to be pot-shaped. The filter of the supply module has the task of filtering the original contamination as well as the contamination that has been additionally introduced into the tank during the refilling procedures, in order for sensitive components, for example the conveying apparatus and the metering module that meters the operating/auxiliary agent into the exhaust tract, to be protected. The major contamination stress when viewed over the service life of the filter is created by the contamination that is introduced when refilling (at least 75%). Since the filter is to be conceived for the service life of the supply module, the capacity of said filter has to be correspondingly high in order for this requirement to be met. On account thereof, and caused by the installation space that is available only to a limited extent, a comparatively high filter construction results. A resistance heater in the form of a heater wire having a constant cross-section which has the task of thawing any reduction medium that has been trapped in the frozen state in the filter interior, on the one hand, and of thawing the tank volume that surrounds the filter, on the other hand, is wound around the filter according to DE 10 2013 222 288 A1. In order for components and costs to be saved and to ensure an efficient heater output, the support member in the solution according to DE 10 2013 222 288 A1 is used for the heater-wire coils of the resistance heater of the filter bodies of the filter. On account of the described requirements set for the filter and for the heater wire which as a consequence of the concept has a length of more than 3 m, operational states for the filter heating combination that depend on the filling level of the operating/auxiliary agent in the storage tank result. The operating/auxiliary agent is in particular a freezing-capable reduction agent, for example urea or a urea/water solution which freezes at external temperatures of below −11° C.

In the case of only a partial liquid coverage of the filter and the heater, or of no coverage at all, by the freezing-capable reduction agent in the storage tank, an intense increase in the temperature in exposed heater-wire regions arises. The cause thereof is an excessive localized dissipation of energy which cannot be dissipated to the environment. In order for damage to components of the filter and of the support part by inadmissibly high temperatures to be avoided, the heater output in the solution according to DE 10 2013 222 288 A1 is reduced by a controller. However, the reduction of the heater output that is associated therewith leads to a deterioration in the thawing behavior.

DE 10 2014 211 251 relates to a supply module for conveying an operating/auxiliary agent of an exhaust gas post-treatment system, having a support member on which a conveying apparatus and a filter are received. A pot-shaped heater element which forms a reservoir for the operating/auxiliary agent is disposed on the support member. The pot-shaped heater element has a pot wall which is configured as a stainless-steel strip or as a steel strip.

Heating devices for heating a tank receiving a freezing-capable operating/auxiliary agent can comprise an auxiliary heater. The auxiliary heater can be configured, for example, as a helically wound heater wire which is electrically connected at a separate plug interface that is configured on a heater module. Since the heater module for heating the freezing-capable operating/auxiliary agent is located in the tank for the latter, sealing of the electrical contact in relation to the reduction medium that is stored in this tank is required. To this end, a number of sealing and fastening elements which, on the one hand, necessitate a significant number of small additional components and, on the other hand, are associated with a significant number of assembly steps are required. Moreover, the additional parts installed, for example annular seals, elastomeric components, and further small parts, represent potential weak spots, reduction agent potentially making its way to critical functional group locations in the case of a failure of said parts in operation.

SUMMARY OF THE INVENTION

This object is achieved according to the invention by a supply module for conveying a freezing-capable operating/auxiliary agent for the exhaust gas post-treatment of an internal combustion engine and for heating a storage tank that receives the freezing-capable operating/auxiliary agent, having a main heater and an auxiliary heater which are electrically contacted on a support member, wherein a pot wall of a heater pot comprises both electrical contacts of the main heater as well as electrical contacts of the auxiliary heater.

In a further design embodiment of the solution that the invention is based on, the electrical contacts are incorporated in a concavity of the pot wall on the circumference of the latter such that said electrical contacts do not project beyond the external circumference of the annularly running pot wall of the heater pot.

In one further preferred variant of embodiment of the supply module proposed according to the invention, the electrical contacts of the main heater are configured so as to be contactable on that side that faces the support member of the supply module. The electrical contacts for the auxiliary heater, which are likewise located on the pot wall, are contactable on both sides, this meaning contactable within the concavity from the lower periphery of the pot wall as well as from the upper periphery of the pot wall.

In one further design embodiment of the solution proposed according to the invention, the electrical contacts of the auxiliary heater are routed through the material of the heater pot and within the concavity on the pot wall protrude into a contact region. On account thereof, a ready establishment of an electrical connection between the electrical contacts of the auxiliary heater and a mating plug is possible from the upper side of the heater pot, wherein the contact region created lies within the concavity of the pot wall of the heater pot of the supply module.

In one further design embodiment of the solution proposed according to the invention, the electrical contacts are sealed in an elastomer-free manner. Sealing of the electrical contacts is performed by configuring a materially integral joint between the support member of the supply module, on the one hand, and the heater pot, on the other hand. Sealing of the electrical contacts of the auxiliary heater by a materially integral joint is performed by configuring the latter between the heater pot and a plastics insulation of the auxiliary heater. The materially integral joint is established in particular by plastics welding such that the O-rings from an elastomeric material, support disks, and other small parts, which are prone to damage and have been necessary to date, can be dispensed with.

The supply module proposed according to the invention on the heater pot within the pot wall is advantageously provided with a heater element that runs in a meandering shape. If the heater element of the main heater that runs in a meandering shape is embodied as a pressed screen, this is favorable in order for dissimilar thermal expansions of the pressed screen and of the plastics insulation of the latter to be compensated. If the main heater that is configured as a pressed screen, for example, runs vertically, the longest sections of the pressed screen thus running in the vertical direction, an expansion that is initiated in the case of a change in temperature will cause an accordion effect in the direction of the largest thermal expansion of the plastics material of the pressed screen. In this case, the stresses created on the plastics molding are correspondingly minor and in particular are below any permissible maximum stress values. This heater element that runs in a meandering shape can be specified as a pressed screen, in the form of a heater wire, or else as a foil.

The heater elements for the main heater that can advantageously be used can be encircling heater elements such as, for example, the very same pressed screen, as well as heater wires, a heater mat, or the heater foil already mentioned, respectively; there is furthermore the possibility of embedding a water heater in the plastics material. In this case, the pressed screen is replaced by a duct which is connected to a liquids circuit.

Instead of the encircling heater elements for the main heater, locally positioned heater elements having an additional heat-conducting member which preferably comprises a metallic material can be used. The locally positionable heater elements can be a heating resistor or one or a plurality of PTC elements, in order to mention examples.

With reference to the heater elements for the main heater that are configured in an encircling manner it is to be noted that said heater elements can likewise have a heat-conducting member. This will be the case in particular when the plastics insulation of the encircling heater element has a very low thermal conductivity. Therefore, plastics with a higher thermal conductivity, which however are electrically isolating, are used. There is furthermore the possibility of suitable fillers, for example mineral agents and/or ceramics being added to the plastics material in order for the thermal conductivity of the plastics material to be influenced. There is alternatively also the possibility of using metallic heat-conducting members, on account of which an optimal thermal conduction is guaranteed within the heater element, wherein the resulting heater output is optimized.

The supply module proposed according to the invention is used in particular in an exhaust gas post-treatment system of an internal combustion engine, in particular of a self-igniting internal combustion engine.

The solution proposed according to the invention is distinguished in that both the main heater as well as the auxiliary heater of the supply module are embodied having a uniformly configured plug interface for both heaters. The electrical contacts that lie in the region of the pot wall permit the omission of elastomeric seals on account of which the ruggedness of the supply module proposed according to the invention is significantly increased. A significant reduction in terms of components can be achieved by virtue of the simplified sealing and fastening concept implemented without small parts such as, for example, O-rings from elastomer. There is the possibility for flexible assembly concepts for the main heater and for the auxiliary heater to be implemented on the uniformly configured plug interface of the electrical contacts, such that the main heater and the auxiliary heater, respectively, can be assembled by external suppliers, or else an assembly can take place at the manufacturer of the supply module. This assembly by virtue of the reduced assembly steps is significantly simplified, on account of which a reduction in costs can be achieved.

The assembly in particular of the auxiliary heater can take place as part of the production at the site of the manufacturer upon completion of the supply module such that a complex conveying of the auxiliary heater through each of the production steps of the supply module can be dispensed with. The assembly of the auxiliary heater can also take place at the final customer, either at the manufacturer of the storage tank for receiving the operating/auxiliary agent or at the OEM. An auxiliary heater of another manufacturer could also be connected within the contact region on the pot wall of the heater pot of the supply module, such that the control of the auxiliary heater could be assumed by the controller that is integrated in the supply module.

In the case of the heater concept proposed according to the invention that comprises the main heater and the auxiliary heater, in terms of the main heater a pot-shaped heater which moreover has a reservoir effect can be implemented, since a reserve of the freezing-capable reduction agent can be heated in the inboard cavity of the heater pot and, accordingly, can be maintained in a liquid state at low external temperatures. The use of a pressed screen configured in a meandering shape, in the interaction with the heat-conducting insert-molding by way of the plastics material, enables a compensation of the thermal expansion. An integrated standard interface, in particular for electrically contacting the auxiliary heater, can be represented by the solution proposed according to the invention.

In terms of the auxiliary heater, a standardized interface for electrically contacting and fastening auxiliary heaters, whether proprietary heaters or third-party heaters, in a simple manner is achieved by the solution proposed according to the invention. The solution proposed according to the invention enables a flexible manufacturing concept to be implemented, whereby open pin ends in the case of an auxiliary heater not being required on the supply module can be closed in a liquid-tight manner by way of a cover cap. The configuration of the seal as a materially integral connection is performed, for example, by hot-tool welding. A significant increase in ruggedness can be achieved in that small parts and soft-material seals can be omitted in the case of the heater concept proposed according to the invention, and that heating strategies in which a total heating output can be flexibly split between the main heater and the optionally provided auxiliary heater can be implemented in terms of control by way of a common controller. This is performed so as to depend on the respective state of the overall system.

BRIEF DESCRIPTION OF THE DRAWINGS

The invention will be described in more detail hereunder by means of the drawing in which:

FIG. 4.1 shows a detailed illustration of an electrical contact interface for the auxiliary heater;

DETAILED DESCRIPTION

Figure 1:
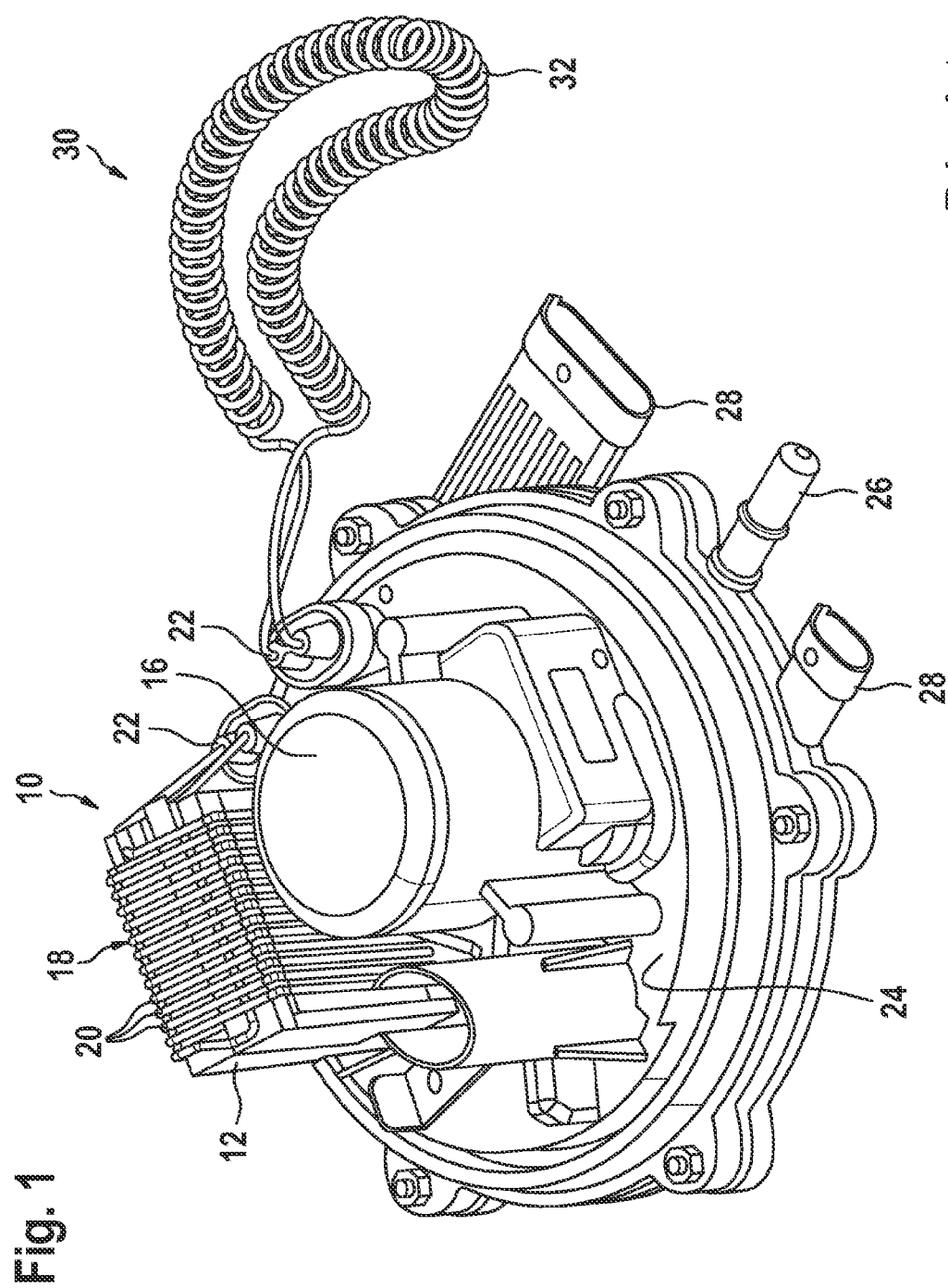
FIG. 1 shows a supply module.

FIG. 1 shows a supply module according to the prior art.

A supply module 10 comprises a filter 12 and a conveying apparatus 16. The filter 12 is surrounded by a main heater 18 which in the exemplary embodiment according to FIG. 1 comprises a plurality of heater-wire coils 20. Electrical connectors 22 for electrically contacting the main heater 18 as well as an auxiliary heater 30 are located on the upper side of the supply module 10. The supply module 10 according to the illustration in FIG. 1 furthermore comprises a support member 24 on which both a hydraulic connector 26 for the operating/auxiliary agent, in particular a freezing-capable reduction agent, as well as connector plugs 28 for electrically contacting the support member 24 of the supply module 10 are configured.

The auxiliary heater 30 which in the exemplary embodiment according to FIG. 1 is configured as a helically wound heater wire 32 is connected to one of the electrical connectors 22.

Figure 2:
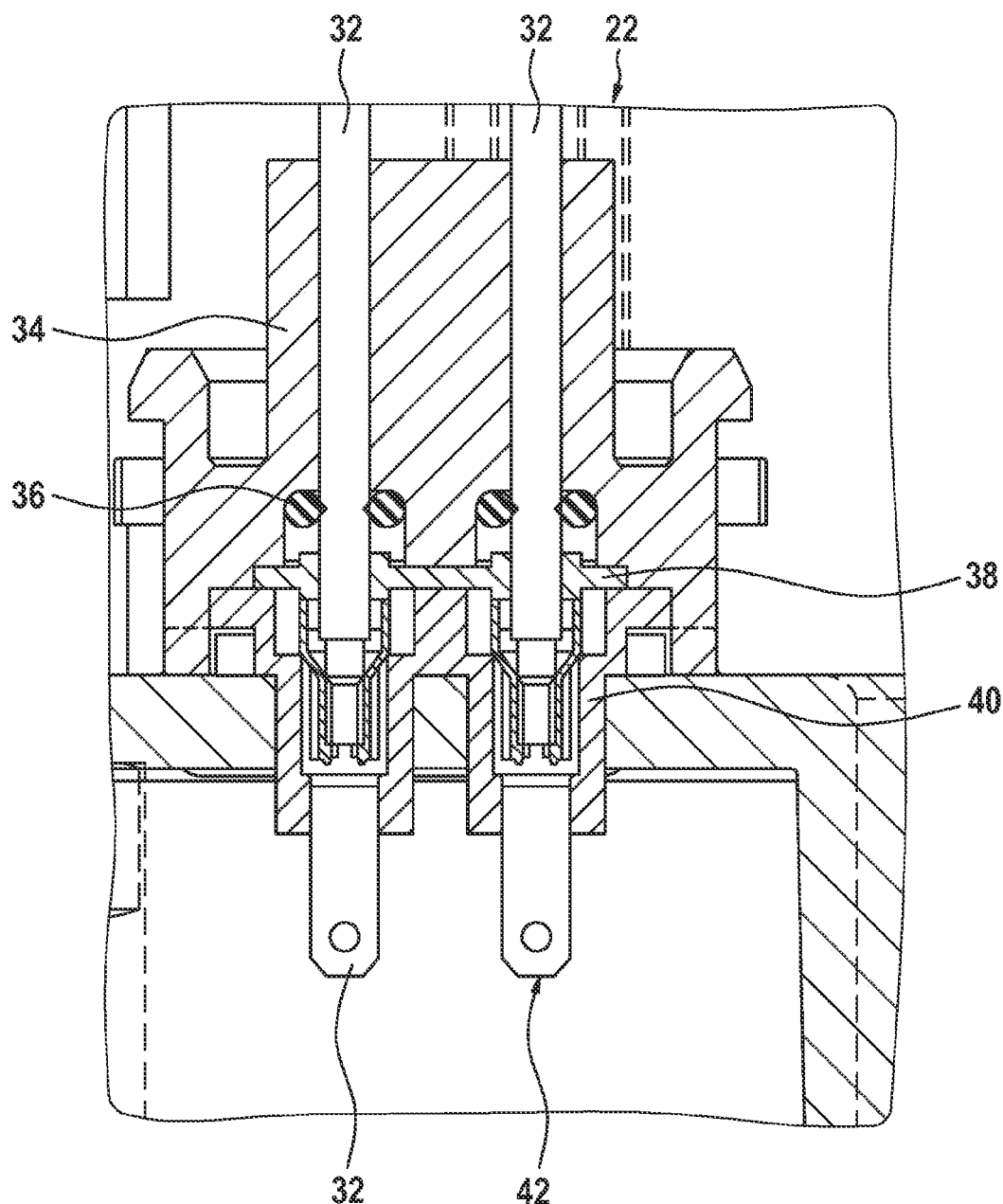
FIG. 2 shows a detailed illustration of a plug interface for electrically contacting an auxiliary heater.

FIG. 2 shows a detail of an electrical contact 22 such as is schematically illustrated in FIG. 1.

It can be seen from the illustration according to FIG. 2 that the heater wire 32 is plug-fitted into a sleeve 34. The ends of the heater wire 32 are provided with O-rings 36 from elastomeric material, said O-rings 36 sealing terminals 42 which are configured in the support member 24 in relation to the reduction agent. Moreover, the ends of the heater wire 32 of the auxiliary heater 30 are surrounded by a disk 38, furthermore by a support member 40 which serves for receiving components and aligning the rotary position of the contacting ends of the heater wire 32. The disk 38 serves as attraction relief, while the O-rings from elastomer 36 serve in particular as a seal in relation to the operating/auxiliary agent that has aggressive properties. It is derived from the illustration according to FIG. 2 that the electrical connectors 22 according to the prior art have a multiplicity of additional components which with a view to the service life of the supply module 10 by virtue of decreasing sealing properties represent weak points.

Figure 3:
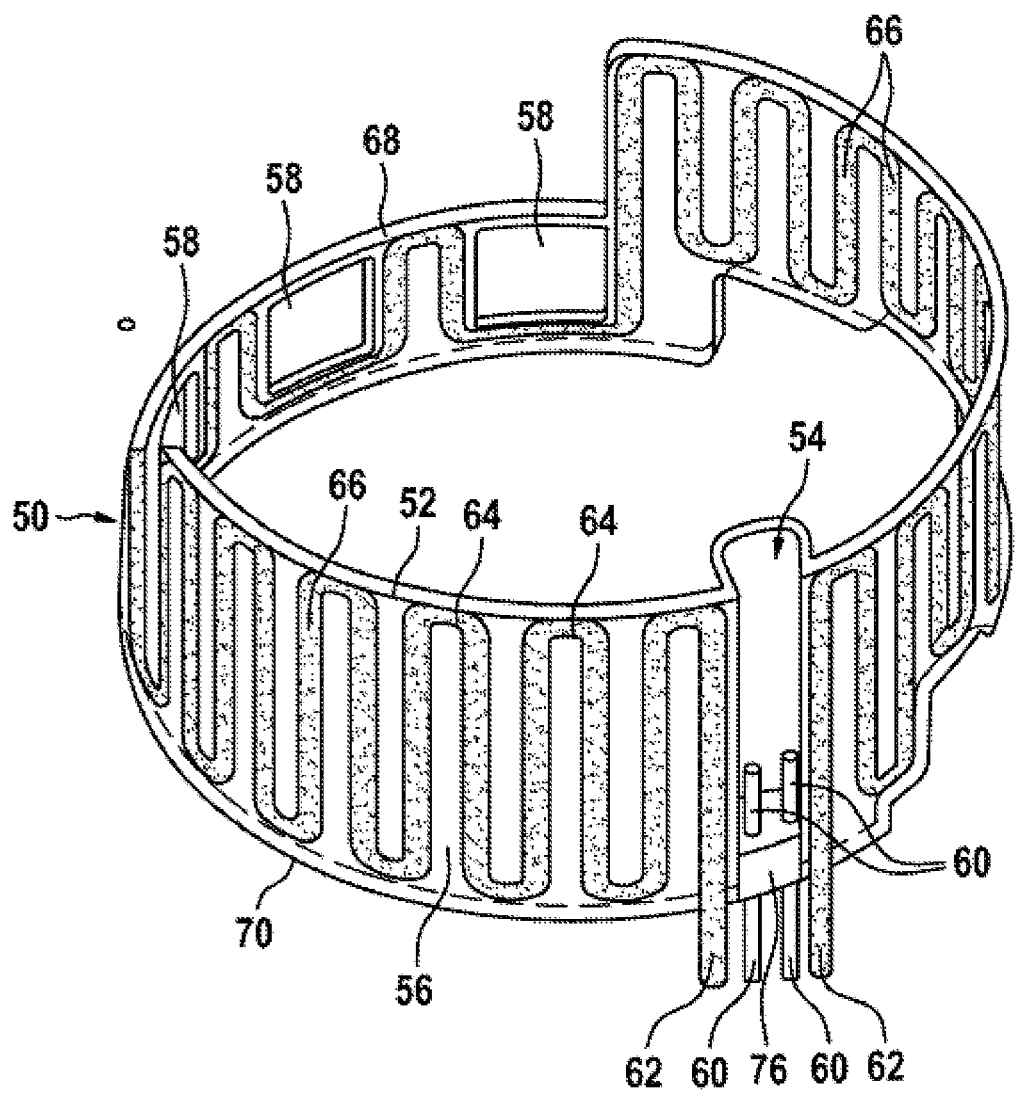
FIG. 3 shows an exemplary embodiment of a pot wall of a heater pot of a supply module, proposed according to the invention.

A variant of embodiment of the supply module proposed according to the invention can be derived from the illustration according to FIG. 3.

As can be derived from the perspective illustration according to FIG. 3, a heater pot 50 comprises an annularly configured pot wall 52. A concavity 54 is configured on the circumference of the pot wall 52. The concavity 54 is embodied in the wall material 56 of the pot wall 52 and, when viewed in the radial direction, extends towards the inside. As can be seen from the perspective illustration according to FIG. 3, the pot wall 52, or the wall material 56 thereof, respectively, can be provided with a number of breakouts 58 which can have a window-shaped appearance, or else be designed in the shape of portholes. The breakouts 58 in terms of the size and the shape thereof can be designed or conceived in an arbitrary manner such that the thawing behavior can be positively influenced, wherein in particular a respective exchange of media can be set by way of these breakouts 58.

FIG. 3 furthermore shows that the pot wall 52 has a first periphery 68 and a second periphery 70 that lies opposite said first periphery 68. Both electrical contacts 60 for electrically contacting the auxiliary heater 30 as well as electrical contacts 62 for contacting the main heater 18 of the supply module 10 extend on the lower side of the pot wall 52 of the heater pot 50, so as to point away from the second periphery 70. It is moreover derived from the illustration according to FIG. 3 that the electrical contacts 62 of the main heater 18 are contactable from the lower side, that is to say from that side of the pot wall 52 that faces the support member 24, while the electrical contacts 62 that lie in a contact region 78 on a plastics insulation are contactable both from the upper side, that is to say from the direction of the first periphery 68 of the pot wall 52, as well as from the lower side. It can be seen from the perspective illustration in FIG. 3 that the upper ends of the electrical contacts 60 of the auxiliary heater 30 open out within the concavity 54, so as to represent a contact region 78. There is thus the possibility for the electrical contacts 60 of the auxiliary heater 30 to be contacted from the upper side when the supply module 10 proposed according to the invention is completely assembled.

A heater element 66 is recessed in the wall material 56 of the pot wall 52 of the heater pot 50 in the illustration according to FIG. 3. The heater element 66 in the form of a meander 64 extends through the wall material 56 of the pot wall 52. The heater element 66 can be embodied as a pressed screen or in the form of one or a plurality of heater wires which likewise can run in the form of a meander 64 in the wall material 56 of the pot wall 52. There is moreover the possibility for the heater element 66 according to the illustration in FIG. 3 to also be embodied as a foil or the like.

Figure 4:
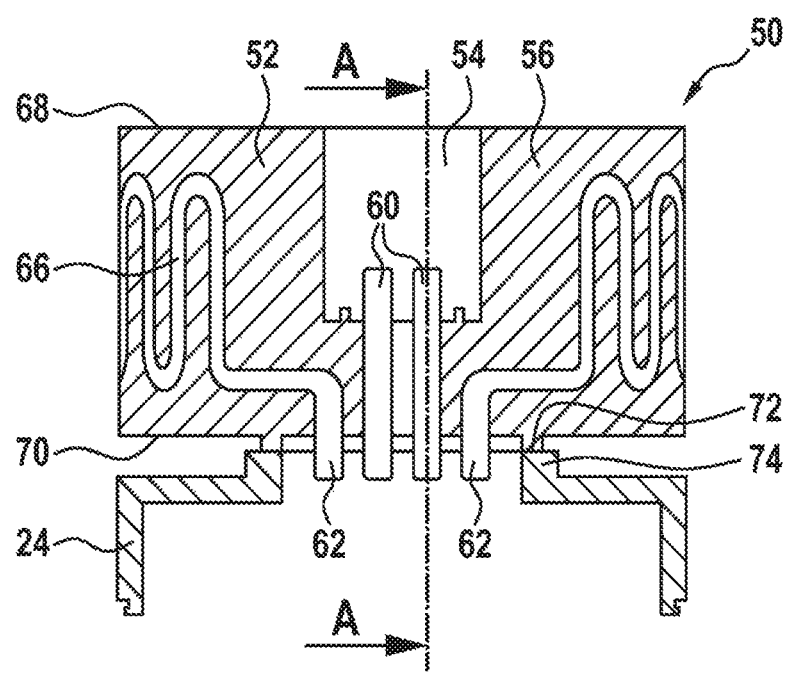
FIG. 4 shows an illustration of a joint between the heater pot and the support member of the supply module.
Figure 4:
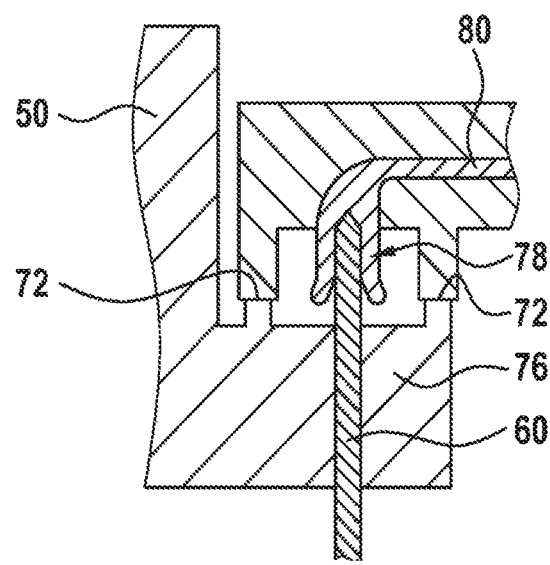

The joint between the support member and the heater pot of the supply module 10 proposed according to the invention can be derived from the illustration according to FIG. 4.

It can be seen in the schematic illustration according to FIG. 4 that the heater element 66, embodied as a pressed screen or as a heater wire or as a foil, in the form of the meander 64 extends through the wall material 56 of the pot wall 52 of the heater pot 50. The ends of the heater element 66 represent the electrical contacts 62 of the main heater 18 of the supply module 10. The electrical contacts 60 of the auxiliary heater 30 are furthermore located in the pot wall 52, or in the wall material 56 of the latter, respectively. Said electrical contacts 60 open out within the concavity 54, on the one hand, therein forming a contact region 78 for electrical contact; on the other hand, the electrical contacts 60 of the auxiliary heater 30 extend beyond the second periphery 70 of the pot wall 52 of the heater pot 50. Accordingly, the electrical contacts 60, 62 for the main heater 18 and for the auxiliary heater 30 project beyond the second periphery 70, that is to say beyond the lower side of the pot wall 52 of the heater pot 50, as is also illustrated in FIG. 3. Protrusions that in each case are embodied as a collar 74, for example, are located on the lower side of the heater pot 50 and the upper side of the support member 24 of the supply module 10 proposed according to the invention. A materially integral joint 72 is embodied on the mutually contacting collars 74 which are configured on the lower side of the heater pot 50, or on the upper side of the support member 24, respectively. Said joint 72 assumes the sealing of all of the electrical contacts 60, 62 which project beyond the second periphery 70 of the heater pot 50. The materially integral joint 72 is in particular a hot-tool weld. On account of the configuration of a materially integral joint 72 between the heater pot 50 and the support member 24 of the supply module 10, a robust seal can be created which can do without the use of additional fastening components such as, for example, the small parts illustrated in FIG. 2, that is to say the sleeve 34, O-rings 36 from elastomer, the disk 38, and the support member 40. This, on the one hand, permits the omission of components such that a reduction in costs can be achieved, while a significant reduction of the assembly steps required can be achieved, on the other hand, by dispensing with the above-mentioned components.

It can be derived from the detailed illustration according to FIG. 4.1 that within the contact region 78 one conductor 80 and the upper end of the electrical contact 64 for the auxiliary heater 30 are in mutual electrical contact.

Figure 6:
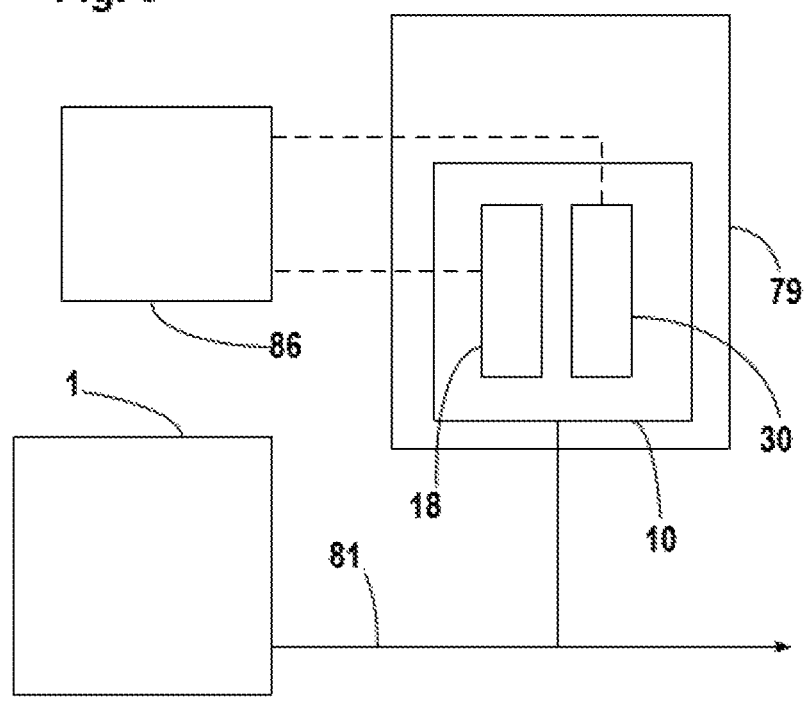
FIG. 6 shows a schematic illustration of the internal combustion engine, the storage tank, the exhaust track, and the controller.

FIG. 4.1 furthermore shows that the material of the electrical contact 60 for the auxiliary heater 30 extends completely through the material of the plastics insulation 76. Sealing of the electrical contact illustrated in FIG. 4.1 is likewise performed by a joint 72 configured in a materially integral manner between a collar which is configured on the heater pot 50, on the one hand, and an insulation. The contact region 78 according to the illustration in FIG. 4.1 is thus also sealed in relation to the freezing-capable reduction medium that is located outside the supply module 10, is received in a storage tank 79 (schematically illustrated in FIG. 6) and has aggressive properties, without elastomeric rings and small parts serving for fastening being required. The supply module 10 proposed according to the invention is particularly suitable for use in an exhaust gas post-treatment system in which a reduction agent, in particular a freezing-capable reduction-agent solution such as urea, or a urea/water solution, is injected by way of a metering module into the exhaust tract 81 of a self-igniting internal combustion engine 1, said metering module being supplied by the supply module 10 proposed according to the invention. The supply module 10 proposed according to the invention is preferably located on the lower side of the storage tank 79 that stores the freezing-capable operating/auxiliary agent.

It is to be noted with reference to the main heater 18 that in the configuration of the heater element 66 that is embedded in the pot wall 52, in particular in the configuration of the heater element 66 as a pressed screen, dissimilar thermal expansions of the pressed screen and of the plastics insulation, that is to say of the wall material 56, can advantageously be compensated for. In particular, if the heater element that is configured as a pressed screen is vertically embodied such that the longest sections of the pressed screen extend in the vertical direction, an accordion effect of the pressed screen in the direction of the largest thermal expansion of the plastics, that is to say in the circumferential direction, can be achieved in the case of a thermal expansion of the heater pot in the circumferential direction. Consequently, stresses created on the plastics molding, that is to say on the pot wall 52 of the heater pot 50, are correspondingly minor and in particular are below any permissible maximum stress values.

Apart from the heater elements 66 that are illustrated in the drawings, there is the possibility for encircling heater elements to be used in the heater pot 50 for the main heater 18. This includes the pressed screen frequently mentioned; furthermore, heater wires, heater mats, or heater foils, respectively, can be used; furthermore water heaters wherein a pressed screen that is recessed in the wall material 56 is replaced by a duct which is connectable to a liquids circuit. Instead of the encircling heater elements 66 there is the possibility for locally positioned heater elements having an additional heat-conducting member which in particular is made from a metallic material to be used. This includes heating resistors and likewise PTEC elements which can be disposed at mutual spacings along the pot wall 52 of the heater pot 50 of the supply module 10.

Figure 5:
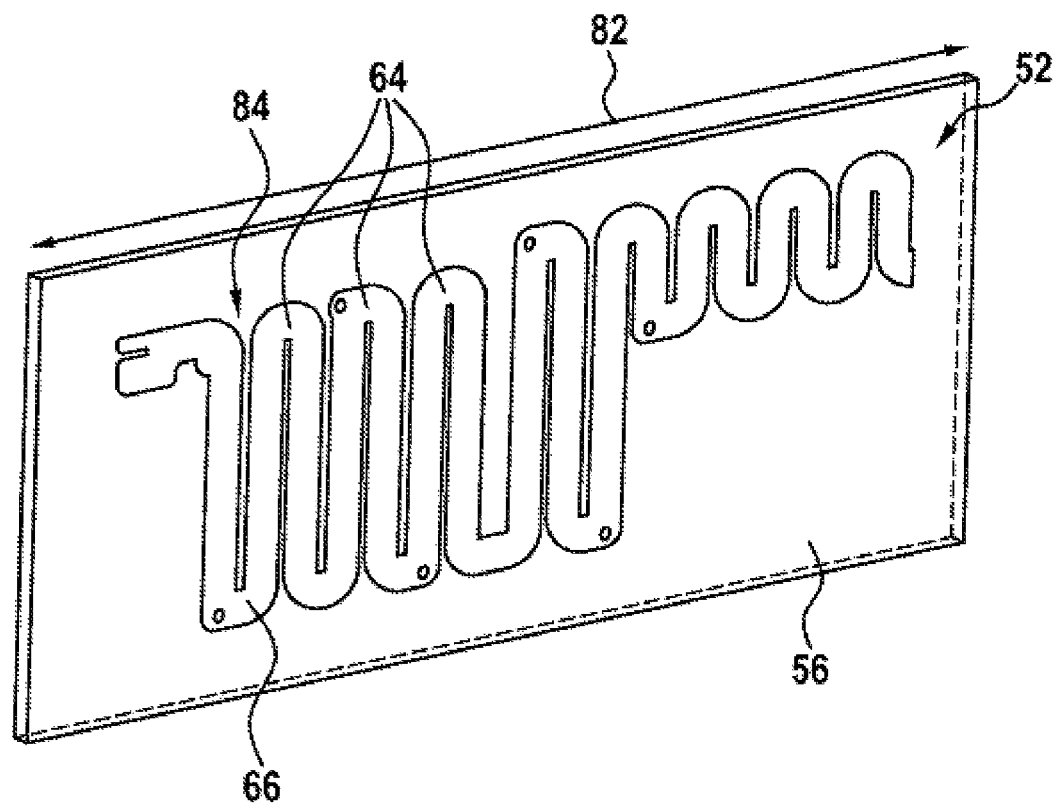
FIG. 5 shows a heater element embedded in a pot wall.

FIG. 5 shows a heater element embedded in a pot wall.

The heater element 66 illustrated in FIG. 5 is a pressed screen which is embedded in the wall material 56 of the heater pot 50. The heater element 66 that is embodied as a pressed screen is recessed in the wall material 56 in a vertical installation position 84. The position 82 indicates a direction of the largest thermal expansion of the wall material 56. The direction of the largest thermal expansion 82 coincides with the lowest rigidity of the heater element 66 that is embodied as a pressed screen, such that said heater element 66 configured in a meandering shape 64 moves in the manner of an accordion in the case of a respective expansion of the wall material 56. The heater element 66 that is embodied as a pressed screen, in terms of the width thereof, the thickness thereof, the length of the individual webs thereof, is conceived such that stresses created in the wall material 56, that is to say respective thermal expansions, are much smaller than the permissible stress of the wall material 56. The accordion effect created enables thermal expansions to be compensated for in a manner that is gentle on the material.

The invention is not limited to the exemplary embodiments described here and to the aspects highlighted therein. Rather, a multiplicity of modifications which are within the practice of a person skilled in the art are possible within the scope specified by the claims.

In terms of the auxiliary heater 30, a standardized interface for electrically contacting and fastening auxiliary heaters, whether proprietary heaters or third-party heaters, in a simple manner is achieved in one embodiment. An embodiment of this kind enables a flexible manufacturing concept to be implemented, whereby open pin ends in the case of the auxiliary heater 30 not being required on the supply module 10 can be closed in a liquid-tight manner by way of a cover cap. The configuration of the seal as a materially integral connection is performed, for example, by hot-tool welding. A significant increase in ruggedness can be achieved in that small parts and soft-material seals can be omitted in the case of the heater concept proposed according to the invention, and that heating strategies in which a total heating output can be flexibly split between the main heater 18 and the optionally provided auxiliary heater 30 can be implemented in terms of control by way of a common controller 86. This is performed so as to depend on the respective state of the overall system.

The invention claimed is:

1. A supply module (10) for conveying a freezing-capable operating/auxiliary agent for an exhaust gas post-treatment of an internal combustion engine (1) and for heating a storage tank (79) that receives the freezing-capable operating/auxiliary agent, the supply module comprising:

a heater pot (50) including an annular pot wall (52), the pot wall (52) having a central axis, a first periphery (68) at a first axial end of the pot wall (52), and a second periphery (70) at an opposite second axial end of the pot wall (52), a main heater (18) having a heater element (66) that runs around the pot wall (52), and an auxiliary heater (30) separate from the main heater (18), wherein the main heater (18) includes separate first and second electrical contacts (62), wherein the auxiliary heater (30) includes separate first and second electrical contacts (60), wherein the first and second electrical contacts (62) of the main heater (18) are separate from the first and second electrical contacts (60) of the auxiliary heater (30), wherein each of the first and second electrical contacts (62) of the main heater (18) and each of the first and second electrical contacts (60) of the auxiliary heater (30) is mounted on the pot wall (52), has a distal end, includes a portion extending beyond the second periphery (70) of the pot wall (52) to the distal end, and is elongated in a direction that is parallel to the central axis of the pot wall (52) over an entire extent of the portion extending beyond the second periphery (70) of the pot wall (52) to the distal end, and wherein the portions of the first and second electrical contacts (60) of the auxiliary heater (30) and the portions of the first and second electrical contacts (62) of the main heater (30) all extend in the same direction, wherein the first and second electrical contacts (60) of the auxiliary heater (30) lie in a concavity (54) of the pot wall (52), wherein the concavity (54) of the pot wall (52) is configured on an outer surface of the pot wall (52), and wherein the first electrical contact (62) of the main heater (18) is positioned on a first side of the concavity (54) of the pot wall (52) and the second electrical contact (62) of the main heater (18) is positioned on a second side of the concavity (54) of the pot wall (52) which is opposite the first side of the concavity of the pot wall (52), and wherein the first and second electrical contacts (62) of the main heater (18) are separated by the first and second electrical contacts (60) of the auxiliary heater (30).

2. The supply module as claimed in claim 1, wherein the portions of the first and second electrical contacts (60) of the auxiliary heater (30) are first portions and the first and second electrical contacts (60) of the auxiliary heater (30) each include a second portion which extends in an opposite direction from the first portion and which is configured to be connected to a conductor (80) of the auxiliary heater (30).

3. The supply module as claimed in claim 1, wherein the portions of the first and second electrical contacts (60) of the auxiliary heater (30) are first portions and the first and second electrical contacts (60) of the auxiliary heater (30) each include a second portion which is mounted on a portion of the pot wall (52), which extends in an opposite direction from the first portion, which terminates in the concavity (54) of the pot wall (52), and which is configured to be connected to a conductor (80) of the auxiliary heater (30).

4. A supply module (10) for conveying a freezing-capable operating/auxiliary agent for an exhaust gas post-treatment of an internal combustion engine (1) and for heating a storage tank (79) that receives the freezing-capable operating/auxiliary agent, the supply module comprising:

a heater pot (50) including an annular pot wall (52), the pot wall (52) having a central axis, a first periphery (68) at a first axial end of the pot wall (52), and a second periphery (70) at an opposite second axial end of the pot wall (52), a main heater (18) having a heater element (66) that runs around the pot wall (52), and an auxiliary heater (30) separate from the main heater (18), wherein the main heater (18) includes separate first and second electrical contacts (62), wherein the auxiliary heater (30) includes separate first and second electrical contacts (60), wherein the first and second electrical contacts (62) of the main heater (18) are separate from the first and second electrical contacts (60) of the auxiliary heater (30), wherein each of the first and second electrical contacts (62) of the main heater (18) and each of the first and second electrical contacts (60) of the auxiliary heater (30) is mounted on the pot wall (52), has a distal end, and includes a portion extending beyond the second periphery (70) of the pot wall (52) to the distal end, wherein the portions of the first and second electrical contacts (62) of the main heater (18) and of the first and second electrical contacts (60) of the auxiliary heater (30) extend parallel to the central axis of the pot wall (52), wherein the first and second electrical contacts (60) of the auxiliary heater (30) lie in a concavity (54) of the pot wall (52), wherein the concavity (54) of the pot wall (52) is configured on an outer surface of the pot wall (52), and wherein the portions of the first and second electrical contacts (60) of the auxiliary heater (30) are first portions and the first and second electrical contacts (60) of the auxiliary heater (30) each include a second portion which is mounted on a portion of the pot wall (52), which extends in an opposite direction from the first portion, which terminates in the concavity (54) of the pot wall (52), and which is configured to be connected to a conductor (80) of the auxiliary heater (30).

5. The supply module as claimed in claim 4, characterized in that the main heater (18) and the auxiliary heater (30) are electrically contacted on a support member (24), wherein the first and second electrical contacts (62) of the main heater (18) are contactable on a side of the pot wall (52) that faces the support member (24).

6. The supply module as claimed in claim 4, characterized in that the first and second electrical contacts (60) of the auxiliary heater (30) are contactable from both sides of the pot wall (52).

7. The supply module as claimed in claim 4, characterized in that the first and second electrical contacts (60) of the auxiliary heater (30) are closed in a materially integral manner from a tank-proximate side, in as far as no auxiliary heater (30) is required on the supply module.

8. The supply module as claimed in claim 4, characterized in that the first and second electrical contacts (60) of the auxiliary heater (30) are routed through wall material (56) of the heater pot (50) and extend into the concavity (54) of the pot wall (52) while forming a contact region (78).

9. The supply module as claimed in claim 4, characterized in that the first and second electrical contacts (60) of the auxiliary heater (30) and the first and second electrical contacts (62) of the main heater (18) are sealed in an elastomer-free manner.

10. The supply module as claimed in claim 4, characterized in that the main heater (18) and the auxiliary heater (30) are electrically contacted on a support member (24), wherein sealing of the first and second electrical contacts (60) of the auxiliary heater (30) and of the first and second electrical contacts (62) of the main heater (18) is provided by a materially integral joint (72) between the support member (24) and the heater pot (50).

11. The supply module as claimed in claim 4, characterized in that sealing of the first and second electrical contacts (60) of the auxiliary heater (30) is provided by a materially integral joint (72) between the heater pot (50) and a plastics insulation (76).

12. The supply module as claimed in claim 4, characterized in that the heater element (66) runs in a meandering shape (64) and is embodied as a pressed screen.

13. The supply module as claimed in claim 4, characterized in that the main heater (18) is pot-shaped and the heater element (66) enables a compensation for thermal expansion.

14. The supply module as claimed in claim 4, characterized in that the main heater (18) is made with a heat-conducting, electrically isolating plastic to which at least one of mineral fillers and ceramic fillers are added.

15. The supply module as claimed in claim 4, characterized in that a total heater output by a controller (86) is flexibly split between the main heater (18) and the auxiliary heater (30).

16. The supply module as claimed in claim 4, characterized in that the heater element (66) runs in a meandering shape (64) and is embodied in the form of a wire.

17. The supply module as claimed in claim 4, characterized in that the heater element (66) runs in a meandering shape (64) and is embodied as a foil.

18. An exhaust gas post-treatment system of an internal combustion engine (1) comprising the supply module (10) as claimed in claim 4.

19. The supply module as claimed in claim 4, wherein ends of the heater element (66) form the first and second electrical contacts (62) of the main heater (18).

20. The supply module as claimed in claim 4, wherein the first electrical contact (62) of the main heater (18) is positioned on a first side of the concavity (54) of the pot wall (52) and the second electrical contact (62) of the main heater (18) is positioned on a second side of the concavity (54) of the pot wall (52), and wherein the first and second electrical contacts (62) of the main heater (18) are separated by the first and second electrical contacts (60) of the auxiliary heater (30).

* * * * *